Oct. 27, 1959        M. MAUL        2,910,228

RECORD CARD CONTROLLED SUMMARY PUNCH

Filed May 11, 1953        7 Sheets-Sheet 1

*Inventor:*
Michael Maul

Oct. 27, 1959  M. MAUL  2,910,228
RECORD CARD CONTROLLED SUMMARY PUNCH
Filed May 11, 1953  7 Sheets—Sheet 4

Inventor:
Michael Maul

Fig. 10

Oct. 27, 1959     M. MAUL     2,910,228
RECORD CARD CONTROLLED SUMMARY PUNCH

Filed May 11, 1953     7 Sheets-Sheet 6

Inventor:
Michael Maul

Inventor:
Michael Maul

United States Patent Office 2,910,228
Patented Oct. 27, 1959

2,910,228

RECORD CARD CONTROLLED SUMMARY PUNCH

Michael Maul, Schwabach, near Nurnberg, Germany

Application May 11, 1953, Serial No. 354,013

Claims priority, application Germany May 20, 1952

14 Claims. (Cl. 235—61.1)

In the art of punched card machines it is known to compute the item data indicated in punched cards and to punch the group total in a total card under accumulator control at the end of a group of item cards. Punching is effected usually simultaneously in a plurality of adjacent perforation columns. Such total card punches may be provided in such a way that a punching device is operatively connected to a tabulating machine or also in such a way that in an independent punching machine the groups of item cards running through the machine are merely computed and that for each card group a total card is prepared.

Total card punches have also already become known in which multi-deck cards are used. In such machines the items of subsequent cards may be computed and the group total can be punched in any selected deck of the total card. It is also possible to derive from a plurality of item fields of a card the items and to compute the same in accumulators, one accumulator being associated to each item card field. In this way, therefore, a plurality of group totals are obtained at the same time. These group totals may then, as far as the number of columns is sufficient, be punched in any deck of the total card, however, in such machines it is not possible to distribute the several group totals upon the various decks of the total card by using a deck common punching mechanism.

This is, however, the main object of the present invention and accordingly in agreement with the presentation of the decks of the total card past the deck common punching mechanism, the latter is automatically set under the control of different accumulators so that the group totals associated to the various item fields can be punched in different decks of a total card.

The machine according to the invention permits a greater freedom in designing the card scheme and therefore in many instances permits the carrying out of certain kinds of punched card work in which the total card and the item card must have the same scheme. It must be considered that it is frequently desirable that the total card and the item card should have the identical division in card fields so that the total in a total field of the summary card has the same location on the card as the corresponding item field in the item card. If, however, the item fields of the item cards are distributed upon several decks, the before mentioned requirement can be met if in the manner according to the invention also the various totals are distributed upon the various decks in the total cards. In those cases, however, in which for reasons of organization or for reasons inherent in the card division it is not possible or necessary to provide the item field on the item card and the total field of the total card on identical places of the card, the machine according to the invention affords still the advantage that the fields in both kinds of cards can be arranged at will and that thereby an optimal exploitation of the capacity of the card can be obtained. No matter, however, which of the advantages of the machine according to the invention is exploited, the deck common punching mechanism is a further advantageous feature which permits to keep the machine comparatively small.

A particular simple machine is obtained if the punching mechanism has a single row of punches having one punch per perforation column. The various hole positions of the superpositioned record columns of the various decks may then be fed one by one past the associated common punches.

In the preferred embodiment of the invention described hereafter upon group change a total card is fed from a total card magazine to the punching mechanism and is punched under the control of accumulators. This total card is thereafter preferably fed to the card receiver for the item cards in such a way that the total card is interpolated between the last item card of the last group and the first item card of the next group. In this manner of operation therefore the total cards are interpolated between the groups of item cards. Therefore, immediately thereafter the stack of cards may be run through a table printer in which the data contained in the cards are simply printed. If it is desirable, however, the total cards may also be gained separately from the item cards.

Though the invention may be applied preferably in a separate total card punch which is not operatively connected to a tabulator, the invention is by no means restricted to that manner of operation. It may rather also be applied in total card punches which are in a known manner operatively connected to a tabulating machine and in which the total card is obtained merely as a by-product of the tabulating machine work. In such operatively connected machines computation of the items is effected in the tabulator which also includes the group control mechanism which in turn controls total card punching upon group change, said total card punching being effected in the total card punch connected to the tabulator.

A preferred embodiment of the invention is illustrated in the accompanying drawings.

*Principles of operation*

Figure 2:
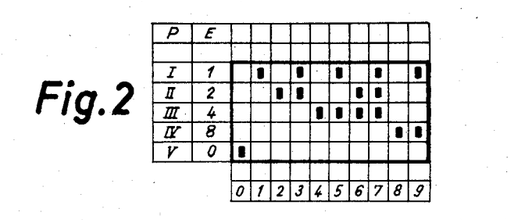
Fig. 2 shows a hole combination code according to which the machine operates.
Figure 3:
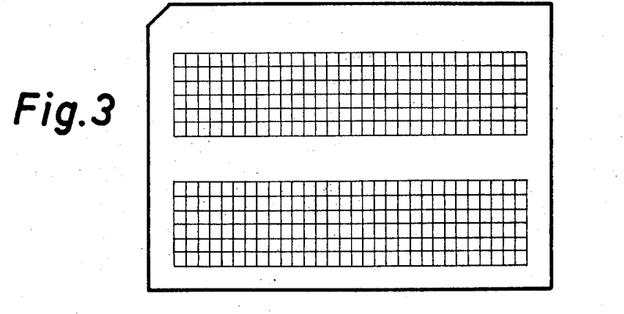
Fig. 3 shows a card as used in the machine which for reasons of simplicity is, however, illustrated unpunched.

The machine operates with double deck cards, of which one is shown in Fig. 3. Each of the two decks comprises 30 columns each including 6 hole positions, Perforation is effected in hole combinations according to the key in Fig. 2. This key requires only five positions. The sixth position has, however, been provided in the card in order to permit punching of letters.

Figure 1:
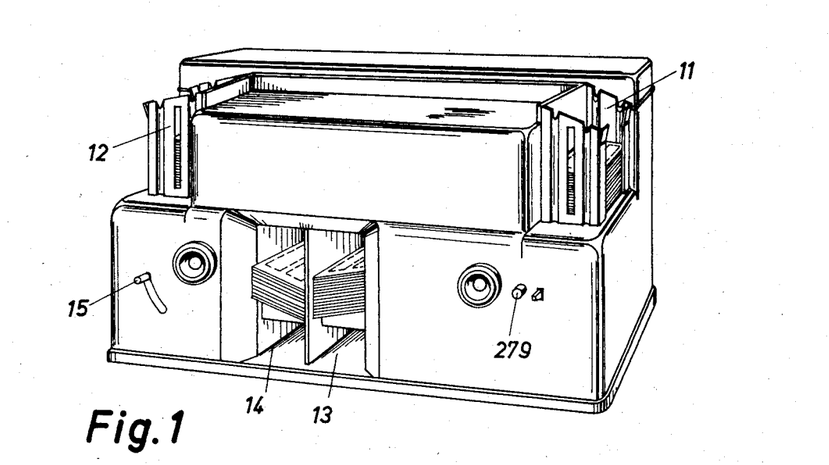
Fig. 1 shows a perspective general view of the machine.

In the right hand magazine 11 (Fig. 1) of the machine are deposited the item cards having the entries which are to be computed. Each item card is fed to the receiving pocket 13 after analyzing. In the left hand magazine 12 are inserted blank cards in which are punched the group number as well as the totals computed in the machine.

Figure 4:
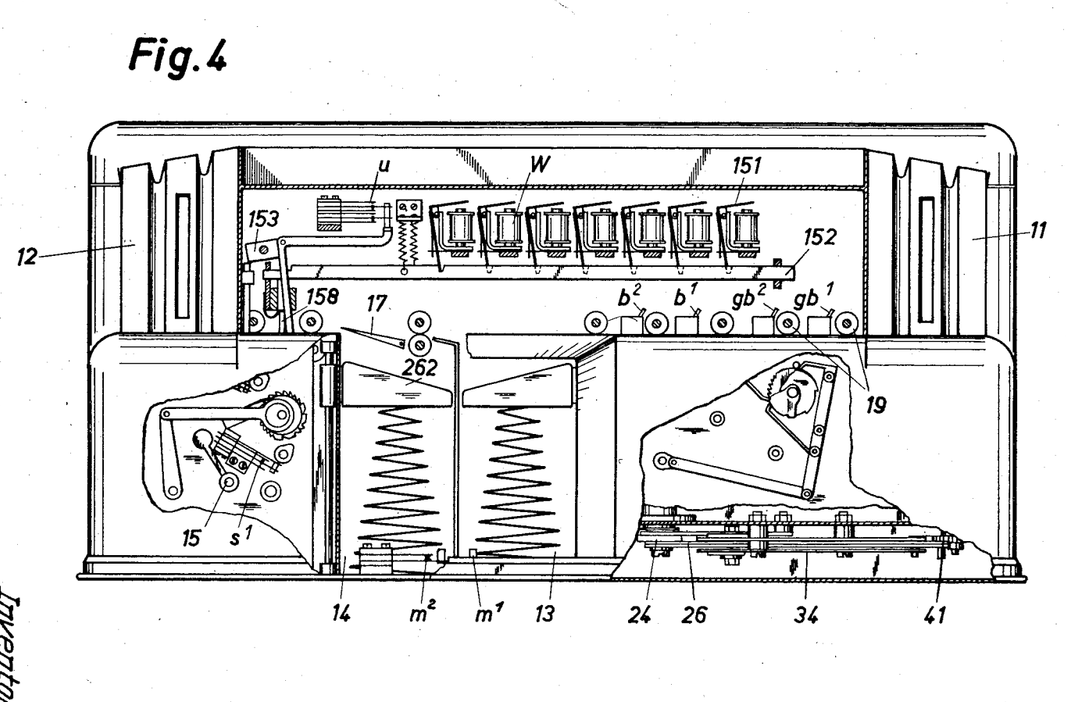
Fig. 4 shows the machine from the front partly in section and partly in elevation.
Figure 11:
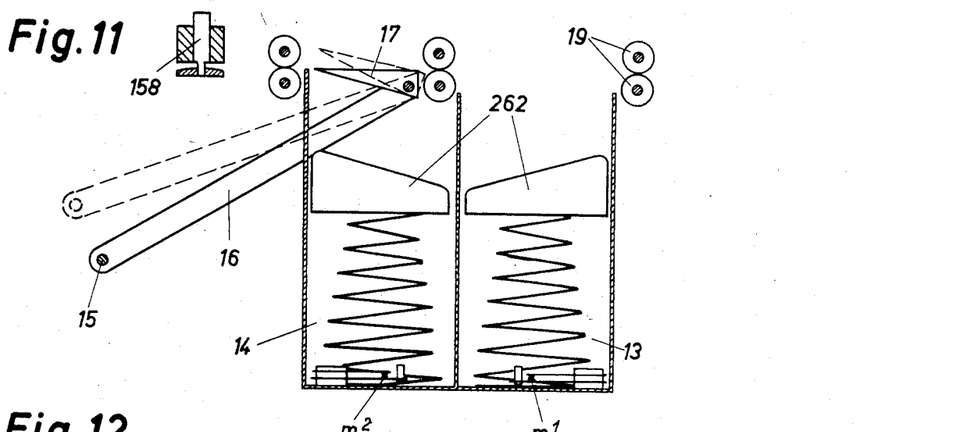
Fig. 11 shows diagrammatically the deflector control for the deposition of the summary cards.

When the summary card is punched it may be selectively deposited in pocket 13 or in the receiving pocket 14. The selection of the pocket is effected by handle 15 by which a card deflector 17 may be displaced through a lever 16 (Figs. 4 and 11). If the handle 15 is in the upper position (indicated in dash lines) the summary cards are deposited in the pocket 14. If, however, the handle 15 is in the lower position the summary cards will be supplied to the pocket 13. In the first instance the machine deposits the item and summary cards separately. In the second instance interpolating of item and summary cards is effected. In order to permit proper deposition of the summary cards in the item card pocket the summary cards in contradistinction to the item cards, travel with the lower card edge leading. Accordingly, the lowermost position of the summary card must be punched first which will be referred to later on.

The results of the analysis of the item cards are entered into accumulators and in group number storing devices which will be referred to later on. A group control device determines the end of a group whereupon analyzing of the accumulators and of the storing devices as well as transferring to the punching mechanism and punching of the summary card is effected. Subsequently the following group of item cards is computed.

The item cards are fed by card knives from the magazine 11 (Fig. 4) between the feed-rollers 19 (Fig. 5), from the latter they are fed at first below the group control brushes $gb^1$ and $gb^2$, and subsequently below the analyzing brushes $b^1$ and $b^2$ which analyze the various positions one by one. Card feeding is effected step by step and the analyzing of all columns of all decks takes place simultaneously, but the various positions are analyzed consecutively.

*Entering of the results of the analysis into the accumulators*

Entering into the accumulators is effected in accordance with values. In this respect the machine operates according to the code in Fig. 2. A certain value is associated with each position, said value being indicated for the various positions in Fig. 2 in column E. The position designation is indicated in column P. Now the different numerals are additively represented by the individual values. The value 6, for instance, is designated by a hole in the II and III position. Herein the II position has the value 2 and the III position the value 4.

The whole value is not entered into the accumulator all at once, but the individual values are entered one by one in accordance with the analysis of the hole positions. The setting of the accumulating mechanism takes place by a drive which is common to all accumulator places, said drive being set to the respective value depending on the position being analyzed. The accumulator place in respect of which there is a hole in the associated column, is clutched to the drive for the time during which the position is analyzed. By means of a plug board it is possible to connect any accumulator place with any brush.

The drive for the accumulator is effected by a crank drive. The crank drive has been chosen because it permits a quiet and safe clutching and declutching at its dead centre. Further the backward movement, which necessarily arises in a crank drive, can be used for declutching.

The crank 24 (Figs. 6 and 9) is continuously driven with constant speed in counterclockwise direction. During each turn of the crank the card is advanced for one position. Upon each full revolution of the crank 24 the crank 25 is displaced one step in counterclockwise direction. The displacement will be described in more detail later on. A rod 26 is pivoted to the crank 24, said rod being provided for reciprocating movement in the guide 27. (This guide is only symbolically indicated in Fig. 9 while actually it is constructed differently therefrom.) The right hand end of the rod 26 described an ellipse-like curve. If the guide 27 is moved the curve will change. At the right hand end of the rod 26 there is a rocker 28 connected thereto by the link 29 which latter rocks in accordance with the curve. The angle through which the rocker 28 swings is dependent upon the shape of the curve. The guide 27 is now moved in such a way as to cause the various angles of swing of the rocker 28 to be proportioned to each other in the same manner as the values according to Fig. 2. The positions of the guide 27 for the various values are indicated in dash lines on the rod 26 in Fig. 9 and are designated with the number I to IV according to the position. In all four positions a constant angle must be subtracted in which the rocker runs idle on account of the play between the gears, and other parts. This play is also necessary for another reason and as will be shown later, it is intentionally increased so that the drive can remain stationary at the moment of clutching. If the play were not provided there would always still be a movement of the drive at the dead centre.

The position and dimensions of the crank drive have been chosen in such a manner that at the one dead centre of the rocker 28 the guide 27 as well as the auxiliary crank drive cooperating therewith may be adjusted without changing the position of the rocker 28. This is necessary since the clutch for the clutching of the accumulator places to their drive must be always in the same position independently of the position in which the guide 27 happens to be. It is only necessary to take care that the guide 27 has already reached the positions (indicated in Fig. 9 by Roman numerals in accordance with the hole position designation) associated with the analyzing positions of the hole positions at the second dead centre of the rocker 28 (indicated in dash lines in Fig. 9) since the position of this point determines the amount by which the accumulator wheel will be advanced.

The adjustment of the guide 27 is effected by the crank 25. The latter makes one revolution for each card run. Dimensions and position have been chosen here in such a manner that the unequal distances between consecutive positions of the guide 27 on the rod 26 are transformed into equal movements of the crank 25.

Figures 6, 7, 8, 9:
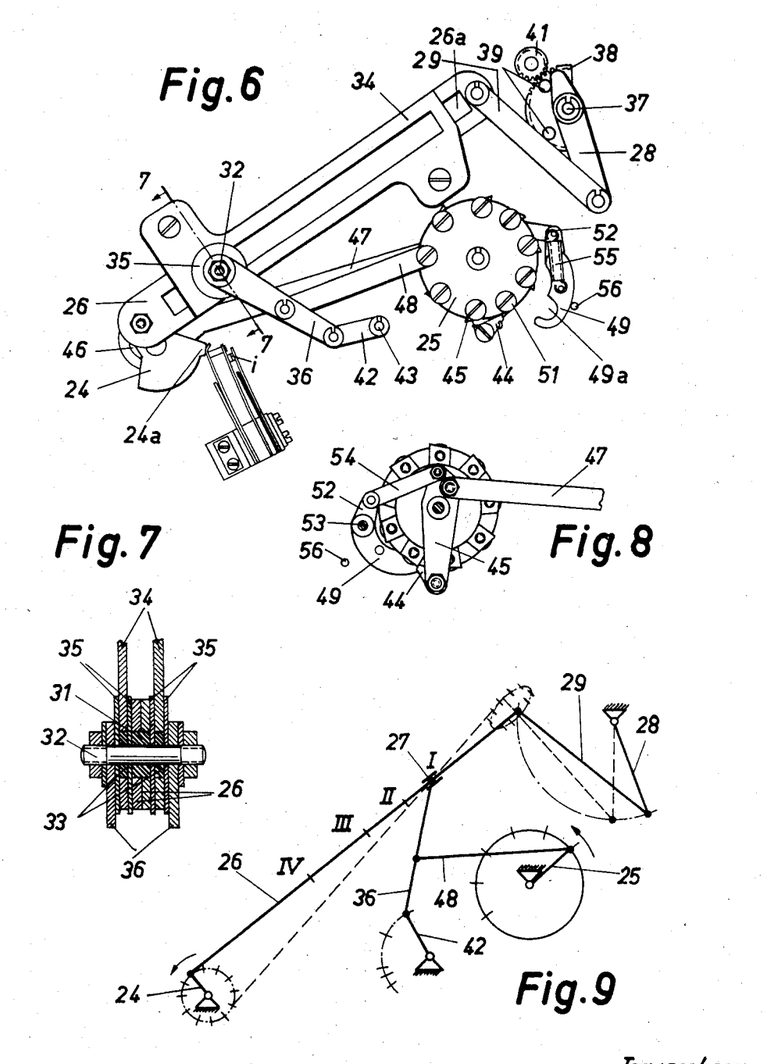
Fig. 6 shows an actual construction of the crank drive for the evaluation of the hole combinations.
Fig. 7 shows a section according to the section line 7—7 of Fig. 6.
Fig. 8 shows the rear view of the controlling means for the crank drive.
Fig. 9 shows an operating diagram of the crank drive.

The actual construction of the crank drive is shown in Fig. 6. The rod 26 consisting of two adjacent metal sheets is linked to the crank 24. It has a rectangular cut out portion 26a in which can slide a guide piece 31 (Fig. 7). The guide piece 31 is loosely seated and rotatable upon the pivot pin 32. On the pin 32 there are further mounted the two loose guide pieces 33 adapted to slide in the guide bars 34 which are provided on both sides of rod 26 and are fast to the base plate. As a protection against mutual interference of rod 26 and the guide bars 34 and in order to prevent the guide pieces from sliding off the disks 35 are provided between the guide pieces 31 and 33. The arrangement of the guide pieces permits sliding of the pin 32 in the guide bars 34, sliding of the rod 26 on the pin 32 and rocking of the rod 26 relative to the fixed guide bars 34 about the axis 32. The displacement of the guide pieces is effected by the two links 36 which are screwed fast to the pin 32. At the left hand end of the rod 26 the rocker 28 is connected by the link 29. The rocker 28 is rotatably mounted on the stud 37 which is fast to the base plate and upon which also the toothed segment 38 can turn loosely. The rocker 28 can take the toothed segment 38 with it by engaging the two stops 39. The position of the stops has been chosen in such manner that upon the change of direction the rocker 28 moves idly through a certain angle with respect to segment 38. This idle movement is necessary in order that when clutching of the registering mechanism takes place (as before mentioned) at the one dead centre the drive is stationary. The toothed segment 38 meshes with the pinion 41 from which the drive for the printing mechanism and counter is derived.

The positioning of links 36 and therewith of guide 27 is effected by crank 25 which in practice takes the form of a ratchet wheel. The rocker 42 connected to the links 36 is rotatably mounted at its right hand end on the stud 43 which is fast in the casing. The rocker 42 is necessary in order to safeguard the proper positioning of the link 36 and thereby also of the guide.

Movement of the ratchet wheel 25 is effected by pawl 44. The pawl 44 is rotatably mounted on the rocket 45 (Fig. 8) and is resiliently held against the ratchet wheel 25. The rocker 45 is driven by an eccentric 46 (Fig. 6) and the eccentric rod 47. The eccentric 46 is mounted upon the same shaft as the crank 24 so that the rocker 45 will rock back and forth once at each revolution of the crank 24. By this means the ratchet wheel 25 will be moved one step by means of pawl 44. By this movement the movement of the guide 27 is effected by means of the link 36 through the bar 48 the latter being pivotally mounted on the ratchet wheel 25.

The position of the guiding pieces in the guide bars 34 must be exactly defined after the rocker 28 has reached the outer dead centre. This is necessary since in this moment declutching of the type wheel takes place. As indicated above, this dead centre position also indicates the value for the associated position. During the remaining time the guide may be moved, this movement having, however, no influence upon the adjustment. The position of the guide has no influence upon clutching since the crank drive and the position of the guide bars 34 have been chosen in such manner that the position of the one dead centre is independent of the positioning of the guide.

Provision must be made that forces occurring and tending to move the guide from the predetermined position which must in no event occur at the outer dead centre, cannot have any influence. Therefore the ratchet wheel 25 is arrested at this moment and is blocked in both directions of rotation so that no unforeseen movements can arise. Blocking is effected by the lever 49 with its semicircular cut out portion 49a. The cut out portion 49a of lever 49 can engage over the screw heads 51 thus blocking the rotation of the crank disk 25 in both directions. This blocking must be maintained for some time. Moreover, a quick engagement is desired which is obtained by a snapaction mechanism. The arm 52 (Fig. 8) is rotatably mounted upon the stud 53 fast to the casing and is connected through link 54 to the rocker arm 45. Therefore the arm 52 will rock synchronously with the rocker arm 45. Upon the stud 53 there is also rotatably mounted the lever 49 which is connected by spring 55 to the arm 52. Under the influence of the rocking movement of arm 52 the lever 49 will now continuously snap back and forth between the stop 56 and the screws 51. The dead centre has been positioned in such manner that the lever 49 engages the screw 51 when the guide or the screws 51 respectively, have reached the proper position.

Accumulator

The back and forth movement of the pinion 41 (Fig. 6) is transferred through a gear mechanism, which will be referred to later, to the shaft 59 having the gears 61 (Fig. 12) fast thereon. For each accumulator place a pinion 61 is provided. The latter meshes with the pinion 62 which is firmly pressed upon the ring 63. In the ring 63 there is provided a slot 63a accommodating the pawl 64 and the spring 65. By the spring 65 the pawl 64 may always be held in one of two rest positions. The ring 63 only rotates upon the teeth of actuating wheel 66 upon which is pressed the remainder of the accumulator devices, which will be referred to later on.

According to the value of the effective hole position each ring 63, driven by its pinion 61 will be rotated. If the clutch magnet has been energized slightly earlier by a hole in the card, the lever 67 will encounter the pawl 64, which will be pressed into a gap between the teeth of the actuating wheel 66, said pawl taking the wheel with it in clockwise direction.

Figure 10:
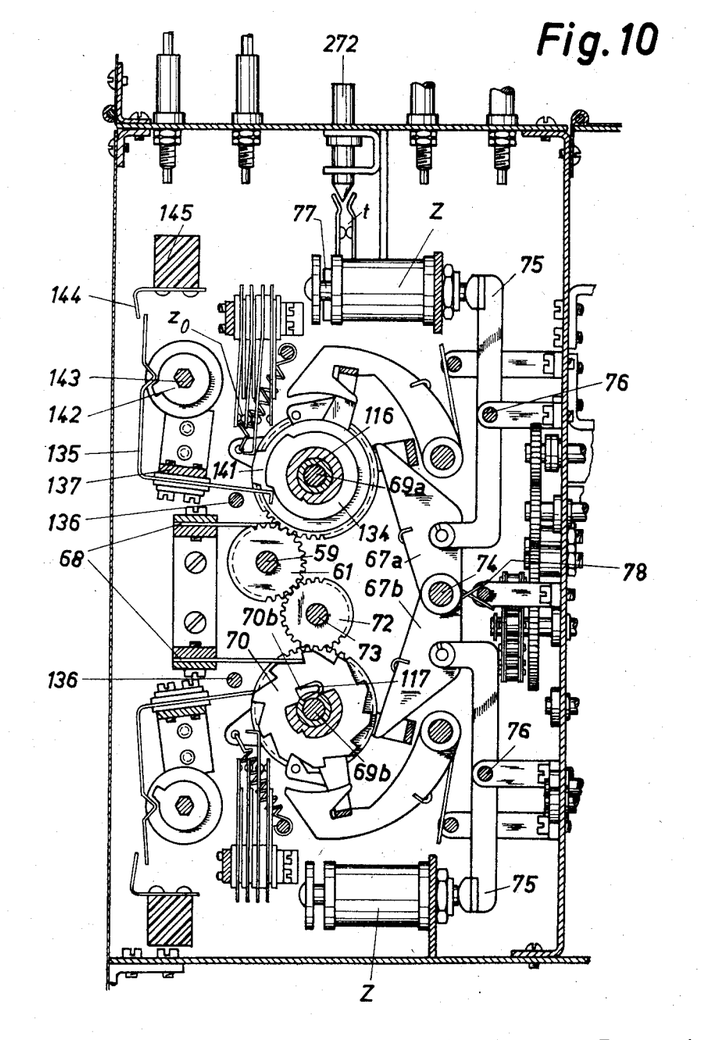
Fig. 10 shows a section through the machine according to the section line 10—10 of Fig. 5.

Upon backward movement of ring 63 the gear 66 is locked against backward movement by spring 68 (Fig. 10). The spring 68 engages with a locking wheel 70 which is fast to the gear 66. The pawl 64 is forced outward by the inclined back face of the tooth until it reaches its outer position in which it will then be held by the spring 65. Accordingly, declutching will automatically take place right at the beginning of the backward movement. The ring 63 will now run back until the dead point for the next clutching operation is reached.

The accumulator places are arranged in two rows on the rear side of the machine (Fig. 10). They are freely rotatable on the two shafts 69a, 69b, respectively. The connection of the accumulator places may be effected during the assembling of the same in a known manner in that the tens transfer is interrupted at the desired accumulator place (splitting).

The drive for the two rows of accumulators is effected through shaft 59 on which are fast the gears 61, as has already been mentioned above. The gears 61 act directly upon the upper accumulator places and upon the lower places through the idle gears 72. The idle gears are freely rotatably mounted on the shaft 73. Clutching is effected by levers 67a, 67b, respectively, through magnets Z, as has already been described above. Declutching is effected by backward rotation of the drive.

The levers 67a and 67b for clutching are mounted on the shaft 74 and are pivoted to the levers 75 which are mounted on the shaft 76. The cores of the clutching magnets Z act upon the levers 75. If there is a hole in the card the upper magnet Z is energized and moves its core 77 to the right (Fig. 10) which rocks the lever 75 in the clockwise direction, and said core rocks the lever 67a in the counter-clockwise direction. Thereby the lever 67a is pressed against the clutching pawl and clutching takes place. The levers 67 and 75 are again restored to their home position by spring 78.

The tens transfer between the various accumulator places is provided according to a known construction, similar to that of the Hollerith machines and will therefore not be described in detail.

The drive for setting the accumulator is effected by the crank drive already described. The latter is provided on the lower side of the machine. The forward and backward movement of the pinion 41 (Fig. 6) is transferred to the bevel gear 114 (Fig. 5) which is fast together with pinion 41 on a shaft. The bevel gear 114 engages the bevel gear 115 which is mounted on the shaft 59 and by means of which the drive of the various accumulator places is effected.

After total taking the accumulators are to be zeroized. For this purpose sleeves 116 are provided on the two shafts 69a and 69b (Fig. 10). There is provided in each ratchet wheel 70 a recess 70b in which the spring 117 is located. Upon setting of the accumulator places these springs slide on slots provided in the sleeve 116. The sleeve 116 is at rest during the setting of the accumulators. If the accumulator is to be set to zero the sleeve of the lower group of the accumulators rotates once in clockwise direction. Simultaneously the sleeve of the upper row of accumulators rotates once in counterclockwise direction. According to the setting of the accumulator places the springs 117 drop one by one into the slots so that the accumulator places are carried round by the sleeve and are zeroized.

Figures 12, 13, 14, 15, 16, 17:
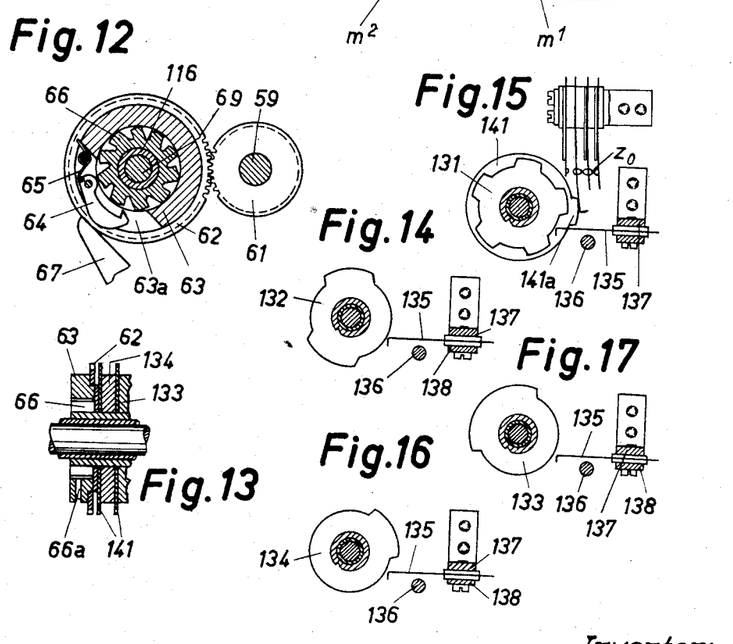
Fig. 12 shows the clutch system in section at right angles to the axis.
Fig. 13 shows the clutch system in section in the axial direction.
Figs. 14 to 17 show the various cam disks for the analysis of the accumulators.

The analysis of the accumulator places must be so effected that the result can be transferred to the punching mechanism in partial value combinations according to the code in Fig. 2. Hence, for the reading of the result each accumulator place includes four cam disks 131, 132, 133, 134 (Figs. 14 to 17) which indicate the partial values in each of the ten adding wheel positions. The cam disks are fastened to the gear 66 (Fig. 13). Moreover the ratchet wheel 70 (Fig. 10) is also fast to the gear 66 for the purpose of locking against backward movement and for the tens transfer. The four cam disks are sufficient for the representation of the numerals since the numerical code extends over four hole positions only with the exception of the zero position. The cam disk 131 corresponds to the position I (Fig. 15) with partial value 1, the cam disk 132 (Fig. 14) to the position II with partial value 2, the cam disk 133 (Fig. 17) to the position III with partial value 4 and the cam disk 134 (Fig. 16) to the position IV with partial value 8. With each cam disk there is associated a contact spring 135 which can be urged against the common conductor 136 by the cams. According to the position of the accumulator place the four springs are brought in contact with the common conductor 136 according to the perforation code (Fig. 2). All the springs 135 are fastened to the stirrup 137. The cam disks are separated from each other by the disks 141. The analysis of the setting of the accumulator wheel by the springs 135 is caused by the cams 142 (Fig. 10) and is similar to the analysis of a card column. By this means, upon total taking, the work can be continued uniformly and the positions can be punched consecutively.

If the accumulator is to be analyzed the shaft 143 (Fig. 10) is shifted step by step. The extent of the steps has been chosen in such way that the shaft 143 reaches its home position again after six steps.

The shaft 143 is formed as a hexagon on which are shifted the cam disks 142. For each spring 135 there is provided a cam disk 142. The cams are always arranged in staggered relation to each other by ⅙. The springs 135 are pressed one by one against the contact bar 144 by the cams. The contact bars are provided separately for each accumulator place and are fixed to the insulating bar 145. The particular selector magnet of the punching mechanism which is to be acted on by the accumulator place is connected by a conductor to the contact bar 144. The pressing of the springs against the contact bar corresponds in its timing to the perforation of the positions of the card. It will be noted, as has already been mentioned above, that punching starts at the lowermost position. The current, however, can only flow through the springs if the latter are simultaneously pressed against the common conductor 136 by the cams 131 to 134. The position of the cams 142 has been chosen in such manner that of the six operations or steps, the second to the fifth coincide with the cams. The first step is idle since in this position the "0" is transferred which is effected by the contacts zo. Also the suppression of the zero perforation above the highest significant figure of a number may be obtained by the contacts zo which, however, does not need to be explained here in detail.

Figure 5:
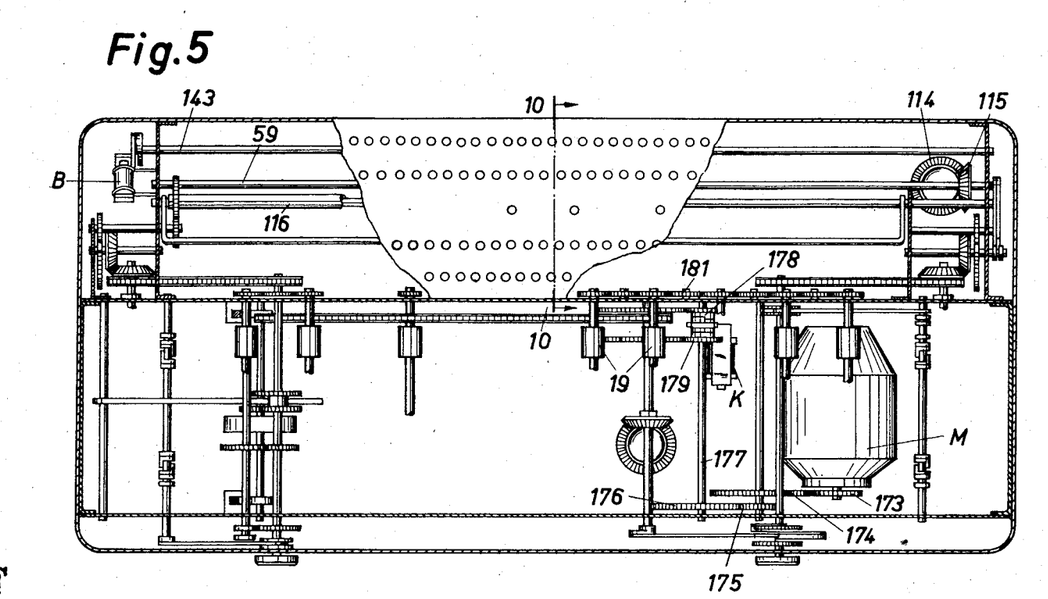
Fig. 5 shows a plan of the machine with the cover removed, in which, particularly the drives for the various shafts may be seen.

The drive of the shaft 143 is effected step by step by magnet B (Fig. 5). If the accumulator is to be analyzed the magnet B receives current impulses. The impulse sequence agrees with the card feed of the summary card. The time sequence and limitation of the impulses will be referred to in the description of the wiring later on.

Punching

While analyzing of the two decks is effected simultaneously punching of the same takes place consecutively by the common row of punches. Accordingly, analysis of the accumulators must take place twice, the punching mechanism being shifted between the two analyzing operations to other accumulators by means of contacts $u$ (Fig. 4). Shifting will be described in detail later on. Punching of the various positions is effected consecutively so that only a single row of punches is required. The analysis of the accumulator is transferred to the selector magnets W which, upon energization, attract their armatures 151 which move the selector bars 152 to the left (Fig. 4) by their arm so that the full cross section of the selector bars comes under the punching yoke 153. After the setting of the selector bars the punching yoke 153 is rocked in the clockwise direction about its axis and presses the displaced selector bars 152 downwards. The latter take with them their punches 158 and press them through the card which is moving in synchronism with the analysis of the accumulator.

Card feed

The drive of the machine is effected from the motor M (Fig. 5) by means of the pinion 173 to a reduction gear comprising the toothed wheels 174 and 175. The toothed wheel 175 meshes with the gear 176 on the shaft 177 which also carries the clutch 178. To the clutch can be clutched either the gear 179 or the gear 181, which are loosely mounted on the shaft 177. The drive for the item card cycle is effected by the gear 179 and the drive for the summary card cycle by the gear 181. The clutch is so arranged that always only one of the two gears may be clutched. Reversing of the drive is effected by the magnet K. If the magnet K is not energised the gear 179 and with it the item card drive is engaged. If the magnet K is energized the gear 181 and with it the summary card drive is engaged. The drive for the feed rollers is effected in a known manner from the gears 179, 181, respectively, by means of a crank drive and a ratchet mechanism.

When the cards have passed through the analyzing or punching device, respectively, they will drop into the receiving pockets 13 or 14, respectively, in which are provided the card supports 262 (Fig. 4). If the card supports have reached their lowermost position they open the contacts $m^1$ or $m^2$, respectively, thereby stopping the machine.

Wiring

In the illustration of the wiring for the summary card punch a simplified method has been chosen, as is generally used in the art of communication. The wiring may be seen from Fig. 18. In order to facilitate reading of the wiring diagram also the relay and cam diagram (Fig. 19) is shown. It indicates the responding or actuating times, of the relays and contacts, depending on the operating cycle of the machine for the described example, in which after an item card a total taking operation takes place and thereafter the advance of the first card of a new group follows. The unit (corresponding to the analysis of a hole position) is one revolution of the crank 24 of the crank drive. As previously indicated, one item card cycle comprises nine of such units which means nine operating cycles.

Before the machine is switched on the two magazines 11 and 12 must be supplied with cards. Thereby the contacts $n^1$ and $n^2$, arranged below the magazines, are closed by analyzing pins (not illustrated). If the machine is switched on the motor will start running and will receive current through the contacts $m^2$, $m^1$, $n^2$, $n^1$. Now the first item card will be advanced from the magazine 11.

The current circuits which are now about to be described are only preliminary and for the purpose of synchronizing the two card movements and of zeroizing accumulator settings if such are present. Right at the beginning the cam contact $p^1$ closes and shortly thereafter the contact $i$ which is controlled by the cam 24a on the crank 24 of the crank drive (Fig. 6). The purpose of these two contacts will be referred to later on. Accordingly the clutch magnets Z for the accumulators receive current through the contacts $p^1$, $i$ and the brushes $b$ since no card is yet between the brushes. Moreover current flows through the brushes $b$ as well as through the brushes $gb$ to the group control relays G. The latter will not respond as they are constructed as differential relays and they respond if only one of the two windings receives current. Though the accumulator magnets Z clutch the accumulator places the setting of the same has no effect yet as they are reset again shortly thereafter, which will be described later on.

If the first card has passed under the analyzing brushes $gb$ the group control relays G respond as the current has been interrupted through the brushes and therewith through one of the two windings. The group control relays G close their contacts $g$ which establish the current circuit to the auxiliary relay H. It is the purpose of the latter to prepare the machine for total taking. It receives current through the contacts $m^2$, $m^1$, $n^2$, $n^1$, $s^2$ and $g$. The relay H responds and actuates its contacts $h$. Together with contact $h_\mathrm{I}$ it closes a holding circuit so that the group control relays G become deenergised and open through their contacts $g$ without causing deenergisation of the relay H. The current circuit to the clutch magnet K is prepared by the contact $h_\mathrm{II}$. Closure of the contact $h_\mathrm{III}$ has no effect since the contact $n^1$ causes a short circuit of the latter. The purpose of contact $h_\mathrm{III}$ will be referred to again later on.

If the item card cycle is finished the cam contact $p^2$ is closed. Thereby the current circuit is established through the clutch magnet K since the contact $h_\mathrm{II}$ has also closed, as has just been described. The clutch magnet K responds, declutches the drive for the item card and clutches the drive for the summary card. The clutch magnet K is provided with a winding which delays its deenergisation, the purpose of which will be referred to later on. Now the first summary card is fed from the magazine 12 to the punching device. Simultaneously also the accumulators are analyzed, the punching magnets are energized and the punching mechanism is actuated. This, however, has no influence as no card is yet under the punching mechanism. The analysis of the accumulator places as well as energizing of the selector magnets will be referred to later on.

If the summary card cycle is finished the accumulators are reset, as has already been described, in order to "clear" them in any case before receipt of the items of the first group. Moreover the cam contact $s^2$ is shifted. The contact $s^2$ will interrupt the current to the auxiliary relay H which will become deenergised and close the circuit to the relay V which will respond, holding itself through the contact $v_\mathrm{I}$ and the cam contact $p^3$ even if the contact $s^2$ again returns to its rest position. The contact $h_\mathrm{I}$ has now re-opened so that the relay H can no longer be energized, even if the contact $s^2$ has returned to its home position. The contact $h_\mathrm{II}$ has also opened so that the current through clutch magnet K is interrupted and the latter becomes deenergised with a certain delay. The delay is necessary in order to permit the contact $s^2$ to return to its rest position before the summary card drive is disengaged. At this moment the preparing circuits are completed and the operation proper of the machine can begin.

Due to the deenergisation of the clutch magnet K the summary card drive has been disengaged and the item card drive has again been engaged. Now the first item card is fed to the analyzing brushes $b$. Shortly before the first position is under the analyzing brushes $b$ the cam contact $p^1$ closes. Its purpose is to close the current circuits to the brushes as long as there is a deck under the latter. Shortly thereafter the contact $i$ closes. It opens after analysis of each position and its purpose is to interrupt the current circuit to the brushes before the same are raised by the cards. This is necessary since otherwise the brushes would spark and would be destroyed thereby. According to the perforation of the card the accumulator magnets Z are energized and clutch the associated accumulator places. If the group number of the subsequent card is the same the group control relays do not respond since upon analysis current always flows through both windings. After analysis of the first position the contact $i$ opens and the second position is fed past the analysing brushes whereupon the contact $i$ closes again. These operations are repeated up to analysis of the last position whereupon also the contact $p^1$ opens again.

The group number is to be stored so that it can be transferred to the summary cards. For this purpose an accumulator has been so arranged, namely with the places $z^1$ to $z^6$, that the same can serve as accumulator as well as a mere storing mechanism. Control for such purpose is effected by means of the key 272 (Fig. 10). If the latter is depressed it opens the contact $t$ and the accumulator places $z^1$ to $z^6$ operate as storing means. In this instance the enterings are analyzed by the first item card only and subsequently the accumulator places are disconnected with regard to the following item cards.

Control is effected by contact $v_\mathrm{II}$. As has already been described above, after the total taking the relay V has been energized by contact $s^2$, said relay holding itself through a holding circuit. Therefore, upon analyzing of the first item card the contact $v_\mathrm{II}$ is closed so that the accumulator magnets $Z^1$ to $Z^6$ are energized as far as the brushes associated therewith find a hole in the card. If an analyzing cycle of the item cards is finished the cam contact $p^3$ opens shortly. The latter interrupts thereby the holding circuit for the relay V so that the latter becomes deenergised and opens its two contacts $v_\mathrm{I}$ and $v_\mathrm{II}$. By means of contact $v_\mathrm{II}$ the accumulator magnets $Z^1$ to $Z^6$ are disconnected. The accumulator magnets $Z^7$ to $Z^{46}$, however, can also receive the enterings of the following item card.

If the group number of a card does not agree with the following card one or more of group control relays G will respond since in this instance only one winding is under current. The auxiliary relay H will be energized through contact $g$ and will operate the clutch magnet K, as has already been described. After clutch reversal the first summary card is fed under the punching mechanism.

In contradistinction to the item card the summary card runs with the lower deck leading. This is necessary since during "interpolating" item cards and summary cards must be placed in proper position one above the other. Shortly before the fifth position of the lower deck comes under the punching device the contact $s^3$ is closed by a cam. The contact $s^3$ is closed as long as there is a deck under the punching mechanism.

After contact $s^3$ has closed the magnet B receives current through contact $s^1$ so that the latter is energized, thereby shifting the accumulator analyzing device by one step and closing the cam contact $s^4$. If now the fifth position is under the punching mechanism the cam contact $s^1$ is shifted. Thereby the current is interrupted through magnet B so that the latter becomes deenergised and the current circuits to the selector magnets are closed through the contact $s^4$, the contacts $z_0$ and the shifting contacts $u$. The selector magnets respond according to the position of the contacts $z_0$ which indicate the zero perforation of an accumulator place and they set their selector bars accordingly. Subsequently the associated punches are pressed through the card.

If the fifth position is punched the contact $s^1$ returns again to its rest position so that the magnet B receives current and advances the analyzing device. Thereby the contact $s^4$ is re-opened, the contacts $z$, however, are closed in accordance with the accumulator setting. For reasons of clearness the four contact springs 135 (Figs. 14-17) of an accumulator place for the analysis are symbolically comprised in the contact $z$. The wiring diagram shows only the contact $z$ of two places of the 46 accumulator places whereas the remainder have been omitted for reasons of clearness. If contact $s^1$ shifts, the current is supplied through the contacts $z$ and $u$ to the selector magnets W. After punching of the fourth position the contact $s^1$ returns to its home position whereby the magnet B is again energized, and the analyzing device advances by one step so that the contacts $z$ are differently set in accordance with the accumulator setting. This cycle will be repeated up to the first position of the lower deck.

If the first position is punched the cam contact $s^3$ opens. During deck change the selector magnets W are switched to other accumulator places by means of contacts $u$. The selection of the accumulator places is effected by means of a known plug board and plug wires.

If the summary card cycle is finished the contact $s^2$ disconnects the auxiliary relay H and connects the relay V, as has been described above. Subsequently, changeover of the card feed clutch and analysis of the first item card of the next group takes place.

Figure 18:
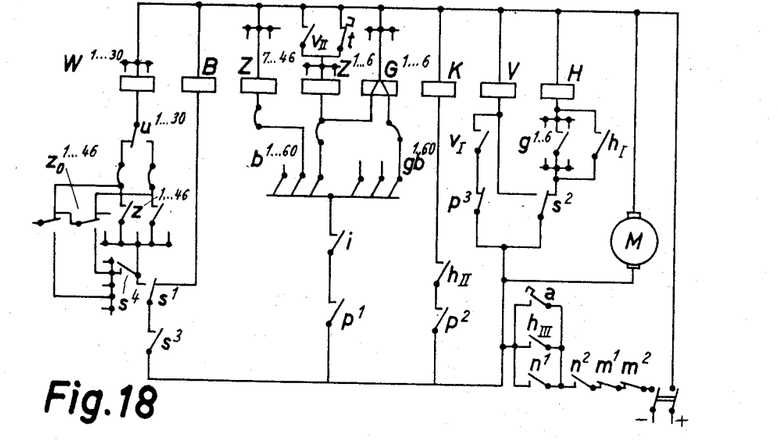
Fig. 18 shows the circuit diagram of the machine.
Figure 19:
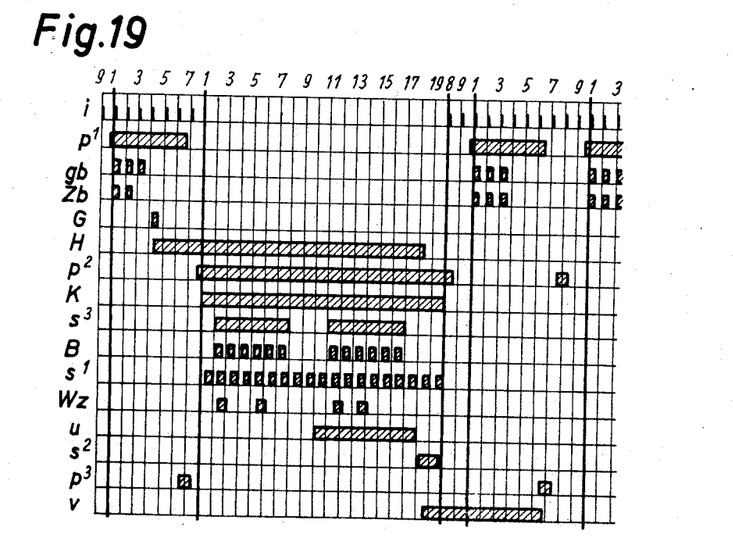
Fig. 19 shows the relay and the cam diagram.

If one of the magazines 13 or 14 is filled the contact $m^1$ or $m^2$ respectively opens, whereby the entire current circuit through the machine is interrupted and the machine is stopped. The same happens if the last card is moved from the magazine 12. In this instance the contact $n^2$ opens. If the magazine 11 is emptied the contact $n^1$ opens and the machine is stopped. If the work is not yet finished cards need only to be reinserted, whereby the contact $n^2$ is closed and the machine again starts running. If, however, the work is finished and if still the last cards in the machine, are to be completely analyzed and punched, the key 279 (Fig. 1) must be depressed temporarily which closes the contact $a$ (Fig. 18). Thereby the current circuits through the machine are restored and the last item card is further fed to the analyzing brushes. If said card has reached the analyzing brushes $b$ the group control will respond since there is no longer a card under the group control brushes $gb$. The contact $g$ closes the current circuit to the relay H which will be energized and which closes the contact $h_{III}$. Now the key 279 may again be released and the contact $a$ can open. The machine, however, continues running since the two contacts $a$ and $n^1$ are shortly closed by contact $h_{III}$ until the contact $h_{III}$ opens or the relay H becomes deenergised, which is the case at the end of a summary card cycle. Consequently automatically the last item cards has been completely analyzed by the machine and the summary card for the last group has been punched and deposited.

I claim:

1. In a summary card punch controlled by multi-deck record cards, sensing devices for said record cards, accumulators under the control of said sensing devices, a total card punching device common to all decks and controllable by said accumulators, means for presenting the decks of a total card one by one to said punching device, and means for selectively punching any of the different decks by said common punching device under the control of an accumulator appropriated to the deck which is under the punching device.

2. In a summary card punch controlled by multi-deck record cards, sensing devices for said record cards, accumulators under the control of said sensing devices, a total card punching device common to all decks and controllable by said accumulators, said punching device consisting of a single row of punches having one punch for a record column, means for feeding a total card index position by index position past said row of punches, and means for selectively punching any of the different decks by said common punching device under the control of an accumulator appropriated to the deck which is under the punching device.

3. In a summary card punch controlled by multi-deck record cards, a separate sensing device for each deck, accumulators under the concurrent control of said sensing devices, a total card punching device common to all decks and controllable by said accumulators, means for presenting the decks of a total card one by one to said punching device, and means for selectively placing the punching device under the control of an accumulator appropriated to the deck which is under the punching device.

4. In a summary card punch controlled by multi-deck record cards in which each deck consists of a plurality of adjacent record columns, each column having a plurality of index positions, a separate row of analyzers for each deck, each row having a single analyzer for each record column, means for analyzing the columns by the associated row of analyzers index position by index position, a plurality of accumulators under the concurrent control of said rows of analyzers, a total card punching device common to all decks and controllable by said accumulators, said punching device consisting of a single row of punches having one punch for a record column, means for feeding a total card index position by index position past said row of punches and means for selectively setting said common punching device under the control of an accumulator appropriated to the deck which is under the punching device while said decks are fed past the punching device.

5. In a summary card punch controlled by multi-deck record cards the combination of a separate set of electrical sensing brushes for each deck, a separate accumulator for each deck, each of said accumulators being under the control of the sensing device for its associated deck, a reading-out mechanism for each accumulator, a total card punching device including a single set of punches common to all decks, and a corresponding set of punch selector magnets, means for feeding a total card past said punches, means for connecting each reading-out mechanism in turn to said set of punch selector magnets while the associated deck is under the punches, and means for effecting an operation of said punching device on each deck in turn.

6. In a summary card punch controlled by multi-deck item record cards the combination of item card sensing devices, corresponding item accumulators under the control of said item sensing devices, a total card punching device common to all decks and controllable by said accumulators, means for presenting a total card deck by deck to said punching device, means for selectively placing the punching device under the control of that accumulator which is appropriated to the deck which is under the punches, means for effecting an operation of said punching device on each deck in turn, a card receiver, means for delivering multi-deck item cards from said item sensing devices to said receiver and means for delivering a multi-deck total card from said punching device to said receiver on top of the corresponding group of item cards.

7. In a summary card punch controlled by multi-deck item record cards the combination of item card sensing means, a group designation sensing device, item accumulators, each of said accumulators being under control of the respective item sensing device, a group designation storage device under control of said group designation sensing device, a multi-deck total card punching device common to all decks and including total punching means operable under the control of an accumulator appropriated to the deck which is under the punching device to punch totals set up therein, and group designation punching means operable under control of said storage device to punch a group designation set up therein, means for presenting the decks of a total card one by one to said punching device, means for setting the group designation punching means from said storage device, means for selectively setting said total punching means from the accumulator appropriated to the deck which is under the punching means, means for effecting an operation of said punching device on each deck in turn, a card receiver, means for delivering multi-deck item cards from said item card sensing device to said receiver, and means for delivering each multi-deck total card from said punching device to said receiver on top of the corresponding group of item cards.

8. In a summary card punch controlled by multi-deck record cards, sensing devices for said record cards, a plurality of accumulators under the control of said sensing devices, a total card punching device common to all decks and controllable by said accumulators, means for presenting the decks of a multi-deck total card one by one to said punching device, and means for selectively setting said deck common punching device under the control of different accumulators upon the the presentation of different decks of the total card to said punching device.

9. In a summary card punch controlled by multi-deck record cards, sensing devices for said record card, a plurality of accumulators under the control of said sensing devices, a total card punching device common to all decks and controllable by said accumulators, said punching device consisting of a single row of punches having one punch for a record column, means for feeding a multi-deck total card index position by index position past said row of punches, and means for selectively setting said deck common punching device under the control of different accumulators upon the presentation of different decks of the total card to said punching device.

10. In a summary card punch controlled by multi-deck record cards, a separate sensing device for each deck, a plurality of accumulators under the concurrent control of said sensing devices, a total card punching device common to all decks and controllable by said accumulators, means for presenting the decks of a multi-deck total card one by one to said punching device, and means for selectively placing the punching device under the control of different accumulators upon the presentation of different decks of the total card to said punching device.

11. In a summary card punch controlled by multi-deck record cards in which each deck consists of a plurality of adjacent record columns, each column having a plurality of index positions, a separate row of analyzers for each deck, each row having a single analyzer for each record column, means for analyzing the columns by the associated row of anlyzers index position by index position, a plurality of accumulators under the concurrent control of said rows of analyzers, a total card punching device common to all decks and controllable by said accumulators, said punching device consisting of a single row of punches having one punch for a record column, means for feeding a total card index position by index position past said row of punches and means for selectively setting said common punching device under the control of different accumulators while said different decks are fed past the punching device.

12. In a summary card punch controlled by multi-deck record cards the combination of a separate set of electrical sensing brushes for each deck, a separate accumulator for each deck, each of said accumulators being under the control of the sensing device for its associated deck, a reading-out mechanism for each accumulator, a total card punching device including a single set of punches common to all decks, and a corresponding set of punch selector magnets, means for feeding a total card past said punches, means for connecting each reading-out mechanism in turn to said set of punch selector magnets while the associated deck is under the punches, and means for effecting an operation of said punching device on each deck in turn.

13. In a summary card punch controlled by multi-deck item record cards the combination of item card sensing devices, corresponding item accumulators under the control of said item sensing devices, a total card punching device common to all decks and controllable by said accumulators, means for presenting a total card deck by deck to said punching device, means for selectively placing the punching device under the control of different accumulators upon the presentation of different decks of the total card to said punching device, means for effecting an operation of said punching device on each deck in turn, a card receiver, means for delivering multi-deck item cards from said item sensing devices to said receiver and means for delivering a multi-deck total card from said punching device to said receiver on top of the corresponding group of item cards.

14. In a summary card punch controlled by multi-deck item record cards the combination of item card sensing means, a group designation sensing device, item accumulators, each of said accumulators being under control of the respective item sensing device, a group designation storage device under control of said group designation sensing device, a total card punching device common to all decks and including total punching means operable under the control of different accumulators upon the presentation of different decks of the total card to said punching device to punch totals set up in said accumulators, and group designation punching means operable under control of said storage device to punch a group designation set up therein, means for presenting the decks of a multi-deck total card one by one to said punching device, means for setting the group designation punching means from said storage device, means for selectively setting said total punching means under the control of different accumulators upon the presentation of different decks of the total card to said punching device, a card receiver, means for delivering multi-deck item cards from said item card sensing device to said receiver, and means for delivering each multi-deck total card from said punching device to said receiver on top of the corresponding group of item cards.

References Cited in the file of this patent
UNITED STATES PATENTS

| 2,126,595 | Weinlich et al. | Aug. 9, 1938 |
| 2,158,872 | Johnstone et al. | May 16, 1939 |
| 2,211,094 | Braun | Aug. 13, 1940 |
| 2,641,408 | Rowley et al. | June 9, 1953 |

FOREIGN PATENTS

| 843,321 | Germany | July 7, 1952 |
| 849,772 | Germany | Sept. 18, 1952 |